(12) United States Patent
Omori et al.

(10) Patent No.: US 6,526,364 B2
(45) Date of Patent: Feb. 25, 2003

(54) METHOD AND APPARATUS FOR MEASURING ROUNDNESS

(75) Inventors: Yoshiyuki Omori, Kure (JP); Ryosuke Watanabe, Kure (JP); Atsushi Tsuruta, Kure (JP); Syuuzou Ueno, Kure (JP); Hideki Shindo, Kure (JP)

(73) Assignee: Mitutoyo Corporation, Kawasaki (JP)

( * ) Notice: Subject to any disclaimer, the term of this patent is extended or adjusted under 35 U.S.C. 154(b) by 0 days.

(21) Appl. No.: 09/759,248

(22) Filed: Jan. 16, 2001

(65) Prior Publication Data

US 2001/0008994 A1 Jul. 19, 2001

(30) Foreign Application Priority Data

Jan. 19, 2000 (JP) ........................................ 2000-010854
Jan. 19, 2000 (JP) ........................................ 2000-010855

(51) Int. Cl.[7] .............................................. G01B 15/08
(52) U.S. Cl. ........................ 702/95; 702/151; 702/167
(58) Field of Search .................... 702/95, 150, 151, 702/157, 167, 168, 169; 364/474.35, 474.37; 33/503, 504, 505, 554, 569, 644, 548, 645

(56) References Cited

U.S. PATENT DOCUMENTS 3,911,257 A * 10/1975 Whitehouse et al. ....... 702/168
4,070,762 A * 1/1978 Siddall ........................ 33/504
5,204,824 A * 4/1993 Fujimaki ..................... 700/61
5,434,803 A * 7/1995 Yoshida ..................... 702/168
5,694,339 A * 12/1997 Ishitoya et al. ............ 702/167
5,926,781 A   7/1999 Scott .......................... 702/151
6,098,452 A * 8/2000 Enomoto ..................... 73/104

FOREIGN PATENT DOCUMENTS

| JP | 2569390   | 10/1996 |
| JP | 2628122   | 4/1997  |
| JP | 06-011337 | * 1/2002 |

* cited by examiner

Primary Examiner—John S. Hilten
Assistant Examiner—John Le
(74) Attorney, Agent, or Firm—Oliff & Berridge, PLC

(57) ABSTRACT

An eccentricity adjusting motor (83) is provided in eccentricity adjusting device (17) that adjusts an eccentricity in a work. A tilt adjusting motor (86) is also provided in tilt adjusting device (18) that adjusts a tilt of the work. A processor (2) computes the eccentricity and tilt of the work, based on which eccentricity/tilt compensating means (105, 106) control the motors (83, 86) to compensate the eccentricity and tilt of the work.

15 Claims, 16 Drawing Sheets

METHOD AND APPARATUS FOR MEASURING ROUNDNESS

BACKGROUND OF THE INVENTION

1. Field of the Invention

The present invention generally relates to an apparatus for measuring roundness of a work. More particularly, it relates to an apparatus for measuring roundness and method of centering and leveling, which has improved precision and operability in compensation of an eccentricity (centering) and tilt (leveling) of the work.

2. Description of the Related Art

A roundness measuring apparatus is employed to measure a roundness of a cylindrical or tubular work. The work is mounted on a table to trace a circumferential surface (an inner or outer surface) of the work by a detector while the table or the detector itself is rotated around the work. The detector has a mechanical measurement range (stroke) of about 1 mm in common, and an electrical measurement range that decreases as a sensitivity (magnification) is increased. This depends mainly on a constraint from a performance of an AID converter (bit width). If the center of the work is deviated from the rotational center of the table or of the detector at the time of measurement, the detector is required to have a much larger stroke (at least double the eccentricity). This leads the detector to an immeasurable situation in over-stroke, otherwise the sensitivity can not be increased due to the above-mentioned reason. Accordingly, a precise centering is required essentially to perform a high sensitive measurement. Further, when the roundness is measured at a plurality of locations along the height of the work, a tilt of the axial center of the work also causes an eccentricity similar to the above and thus it requires leveling as well.

From the above reasons, the table for receiving the work mounted thereon is provided with mechanisms for centering and leveling (Japanese Patent Nos. 2,569,390 and 2,628,122, for example). The centering mechanism comprises mechanisms for moving the table in X- and Y-axes both perpendicular to the axial center of the work (the vertical axis=Z-axis). These centering axes are hereinafter referred to as CX- and CY-axes. The leveling mechanism comprises mechanisms for positioning the table on a spherical base and pushing the table in X- and Y-axes to slide it along the spherical base. These leveling axes are hereinafter referred to as LX- and LY-axes.

On centering and leveling, the work is first mounted on the table and the detector traces the circumference of the work to position the work at a location inside the stroke of the detector. A height of the detector at this situation is referred to as ZA. A measurement is performed in this situation to collect data, from which a set of central coordinates of the work at the height ZA is derived. Next, the detector is positioned at a height of ZB and another measurement is performed similarly to collect data, from which another set of central coordinates of the work at the height ZB is derived. From these sets of central coordinates of the work at the heights ZA and ZB, an amount of centering (an amount of eccentric compensation) and an amount of leveling (an amount of tilt compensation) of the work in the X- and Y-axes are computed and displayed. The centering and leveling mechanisms comprise micrometer heads. Therefore, these mechanisms can be manipulated manually, on the basis of the amounts of compensation thus displayed, to perform centering and leveling while reading displays on the micrometer heads.

SUMMARY OF THE INVENTION

The present invention has an object to provide an apparatus for measuring roundness, which can afford much simplified workability and improved precision to centering and leveling.

The present invention has another object to provide an apparatus for measuring roundness and method of centering and leveling, which can perform precise centering and leveling, thereby reducing a period of time required for setup activities.

The present invention is provided with an apparatus for measuring roundness, which comprises: a table for receiving a work mounted thereon, the work having a circumferential surface with a roundness to be measured; displacement detecting means for detecting displacements on the circumferential surface of the work; rotational driving means for rotationally driving either the table or the displacement detecting means such that the displacement detecting means detects the displacements along the circumferential surface of the work; eccentricity adjusting means for adjusting an eccentricity in the work, the eccentricity adjusting means including an eccentricity adjusting motor to move the table in a plane perpendicular to the rotational axis of the rotational driving means; tilt adjusting means for adjusting a tilt of the work to the rotational axis, the tilt adjusting means including a tilt adjusting motor to incline the table; computing means for calculating the eccentricity and tilt of the work from the displacements on the circumferential surface of the work detected by the displacement detecting means; and eccentricity/tilt compensating means for driving the eccentricity adjusting motor and tilt adjusting motor on the basis of the eccentricity and tilt obtained by the computing means to compensate the eccentricity and tilt.

According to the present invention, the eccentricity adjusting motor and tilt adjusting motor are respectively provided in the means for adjusting the eccentricity in the work and means for adjusting the tilt of the work. In addition, the eccentricity/tilt compensating means drives these motors on the basis of the eccentricity and tilt of the work obtained by the computing means to compensate the eccentricity and tilt of the work. This prevents any sophisticated manual operations and matching errors on manual operations from occurring and can improve the operability and matching precision effectively.

The motors may be controlled in open-loop though, preferably, the apparatus may further comprise detecting means for detecting amounts of movements of the table in a plane perpendicular to the rotational axis and in a tilt direction about the rotational axis. In this case, the eccentricity/tilt compensating means drives the eccentricity adjusting motor and tilt adjusting motor using the amounts of movements of the table detected by the detecting means as amounts of feedback. This enables precise operations of centering and leveling to be performed by feedback control.

When the eccentricity and tilt of the work are obtained by the computing means, the following may be effective, for example. Namely, the computing means calculates central coordinates of the work mounted on the table at a plurality of locations along the rotational axis from the displacements on the locations of the circumferential surface of the work, which are measured by the displacement detecting means. Then, it computes the eccentricity and tilt based on the central coordinates.

The eccentricity/tilt compensating means may drive the eccentricity adjusting motor and tilt adjusting motor simultaneously to further reduce a period of compensation time.

The present invention is also provide with an apparatus for measuring roundness, which comprises: a table for receiving a work mounted thereon, the work having a circumferential surface with a roundness to be measured; displacement detecting means for detecting displacements on the circumferential surface of the work; rotational driving means for rotationally driving either the table or the displacement detecting means such that the displacement detecting means detects the displacements along the circumferential surface of the work; eccentricity adjusting means for adjusting an eccentricity in the work, the eccentricity adjusting means including means for detecting an adjusted eccentricity by detecting an amount of movement of the table when it is moved in a plane perpendicular to the rotational axis of the rotational driving means; computing means for calculating an eccentricity in the work from the displacements on the circumferential surface of the work detected by the displacement detecting means; and display means for displaying the adjusted eccentricity detected by the means for detecting an adjusted eccentricity and the eccentricity obtained by the computing means as an amount of eccentric compensation.

According to the present invention, an amount of operation given to the eccentricity adjusting means is detected and displayed as an adjusted eccentricity by the means for detecting the adjusted eccentricity. Therefore, the eccentric adjustment can be performed precisely. This eliminates the need for repeating centering operations and can reduce a period of preparation time prior to an actual measurement, improving workability.

The present invention is further provided with an apparatus for measuring roundness, which comprises: a table for receiving a work mounted thereon, the work having a circumferential surface with a roundness to be measured; displacement detecting means for detecting displacements on the circumferential surface of the work; rotational driving means for rotationally driving either the table or the displacement detecting means such that the displacement detecting means detects the displacements along the circumferential surface of the work; tilt adjusting means for adjusting a tilt of the work to the rotational axis, the tilt adjusting means including means for detecting an adjusted tilt by detecting an amount of movement of the table when it is inclined; computing means for calculating the tilt of the work from the displacements on the circumferential surface of the work detected by the displacement detecting means; and display means for displaying the adjusted tilt detected by the means for detecting an adjusted tilt and the tilt obtained by the computing means as an amount of tilt compensation.

According to the present invention, an amount of operation given to the tilt adjusting means is detected and displayed as an adjusted tilt by the means for detecting the adjusted tilt. Therefore, the tilt adjustment can be performed precisely. This eliminates the need for repeating leveling operations and can reduce a period of preparation time prior to an actual measurement, improving workability.

The present invention is still further provided with an apparatus for measuring roundness, which comprises: a table for receiving a work mounted thereon; detecting means for detecting displacements on the work, the work having a circumferential surface with a roundness to be measured; rotational driving means for rotationally driving either the table or the detecting means about a rotational axis; and centering means for obtaining an eccentricity in the work from the rotational axis and compensating the eccentricity on measuring the roundness. In this case, the centering means obtains an angular error between an operational direction of centering and an angular reference of the rotational driving means and centers the work on the basis of the angular error and the eccentricity.

The present invention is still yet further provided with an apparatus for measuring roundness, which comprises: a table for receiving a work mounted thereon; detecting means for detecting displacements on the work, the work having a circumferential surface with a roundness to be measured; rotational driving means for rotationally driving either the table or the detecting means about a rotational axis; and leveling means for obtaining a tilt of the work to the rotational axis and compensating the tilt on measuring the roundness. In this case, the leveling means obtains an angular error between an operational direction of leveling and an angular reference of the rotational driving means and levels the work on the basis of the angular error and the tilt.

The present invention is provided with, in a roundness measurement in which either a work or detecting means is driven rotationally about a rotational axis by rotational driving means to measure a roundness of the work by the detecting means, a method of centering for obtaining an eccentricity in the work from the rotational axis to compensate the eccentricity. The method comprises: obtaining an angular error between an operational direction of centering and an angular reference of the rotational driving means; and centering the work on the basis of the angular error and the eccentricity.

The present invention is also provided with, in a roundness measurement in which either a work or detecting means is driven rotationally about a rotational axis by rotational driving means to measure a roundness of the work by the detecting means, a method of leveling for obtaining a tilt of the work to the rotational axis to compensate the tilt. The method comprises: obtaining an angular error between an operational direction of leveling and an angular reference of the rotational driving means; and leveling the work on the basis of the angular error and the tilt.

As obvious from the forgoing, centering and leveling according to the present invention can be achieved precisely and effectively with a little quantity of operation in consideration of the previously obtained angular error between the angular reference of the rotational driving means and the operational direction of centering or leveling operation.

The angular error may be calculated from central coordinates of the work before and after the work is moved a predetermined amount, for example, in the operational direction of centering. The centering or leveling may be performed in the operational direction of centering or leveling when the angular reference of the rotational driving means is shifted by the angular error. The centering or leveling may also be performed after coordinate transformation of the tilt of the work into a coordinate system relative to the operational direction of centering or leveling based on the angular error.

Other features and advantages of the invention will be apparent from the following description of the preferred embodiments thereof.

BRIEF DESCRIPTION OF THE DRAWINGS

The present invention will be more fully understood from the following detailed description with reference to the accompanying drawings in which.

DETAILED DESCRIPTION OF THE PREFERRED EMBODIMENTS

Figure 1:
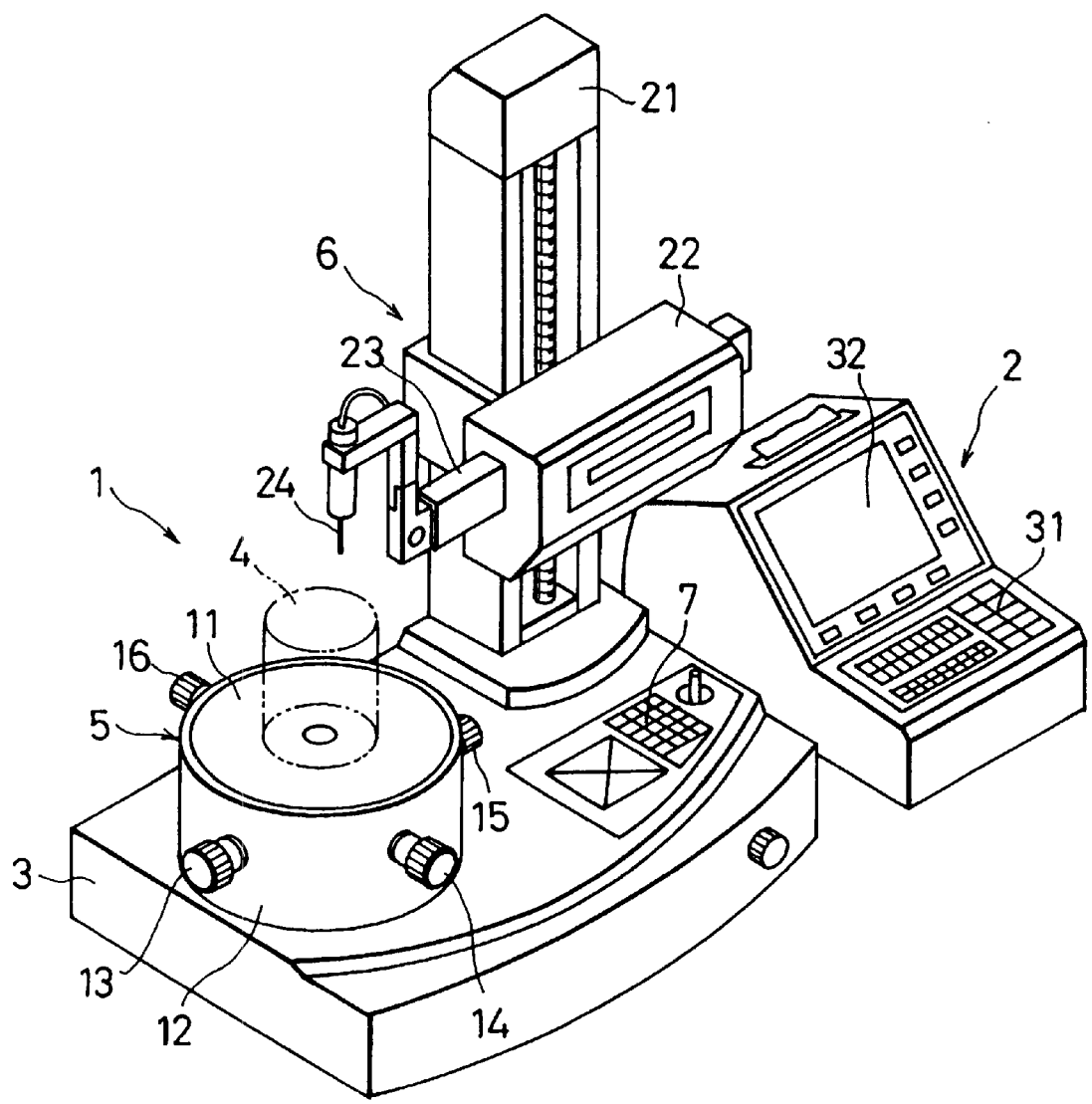
FIG. 1 is a perspective view showing a roundness measuring apparatus according to a first embodiment of the present invention.

FIG. 1 is a perspective view showing an appearance of a roundness measuring apparatus according to a first embodiment of the present invention. This roundness measuring apparatus comprises a tester 1 or the body of the measuring apparatus and a processor 2. The tester 1 includes a base 3, on which a centering table 5 is provided for receiving a cylindrical or tubular work 4 mounted thereon to rotate it. The tester 1 also includes a displacement detector 6 that detects radial displacements on a circumferential surface of the work 4 mounted on the centering table 5 and a console 7 that is employed to operate these parts.

The centering table 5 includes a disk-like table 11 and a rotational driver 12 located beneath the table 11 to rotationally drive it and accordingly rotate the work 4 mounted on the table 11. On the side of the centering table 5, centering knobs 13, 14 for eccentric adjustment and leveling knobs 15, 16 for tilt adjustment are arranged at an interval of about 90 degrees along the circumference. These knobs 13–16 are operative to manually center and level the table 11.

The displacement detector 6 has the following configuration. An upstanding column 21 is provided on the base 3 and extends upwardly. A vertically movable slider 22 is attached onto the column 21. An arm 23 is provided on the slider 22. The arm 23 has a probe 24 at the top thereof and is driven laterally to contact the probe 24 with the outer circumferential surface of the work 4. Thus, when the work 4 is rotated, the detector 6 can detect radial displacements on the outer circumferential surface of the work 4 to provide measured data.

The measured data obtained from the displacement detector 6 are fed into the processor 2, which computes central coordinates and roundness of the work 4 for a measured cross-section. The processor 2 contains computing means for calculating an eccentricity and tilt to be compensated and displaying them on a display 32 based on operations given to a console 31 at the time of a preliminary measurement prior to an actual measurement. The processor 2 also contains eccentricity/tilt compensating means for driving eccentricity adjusting means and tilt adjusting means based on the obtained eccentricity and tilt as described later.

A detailed configuration of the centering table 5 will be described next.

Figure 2:
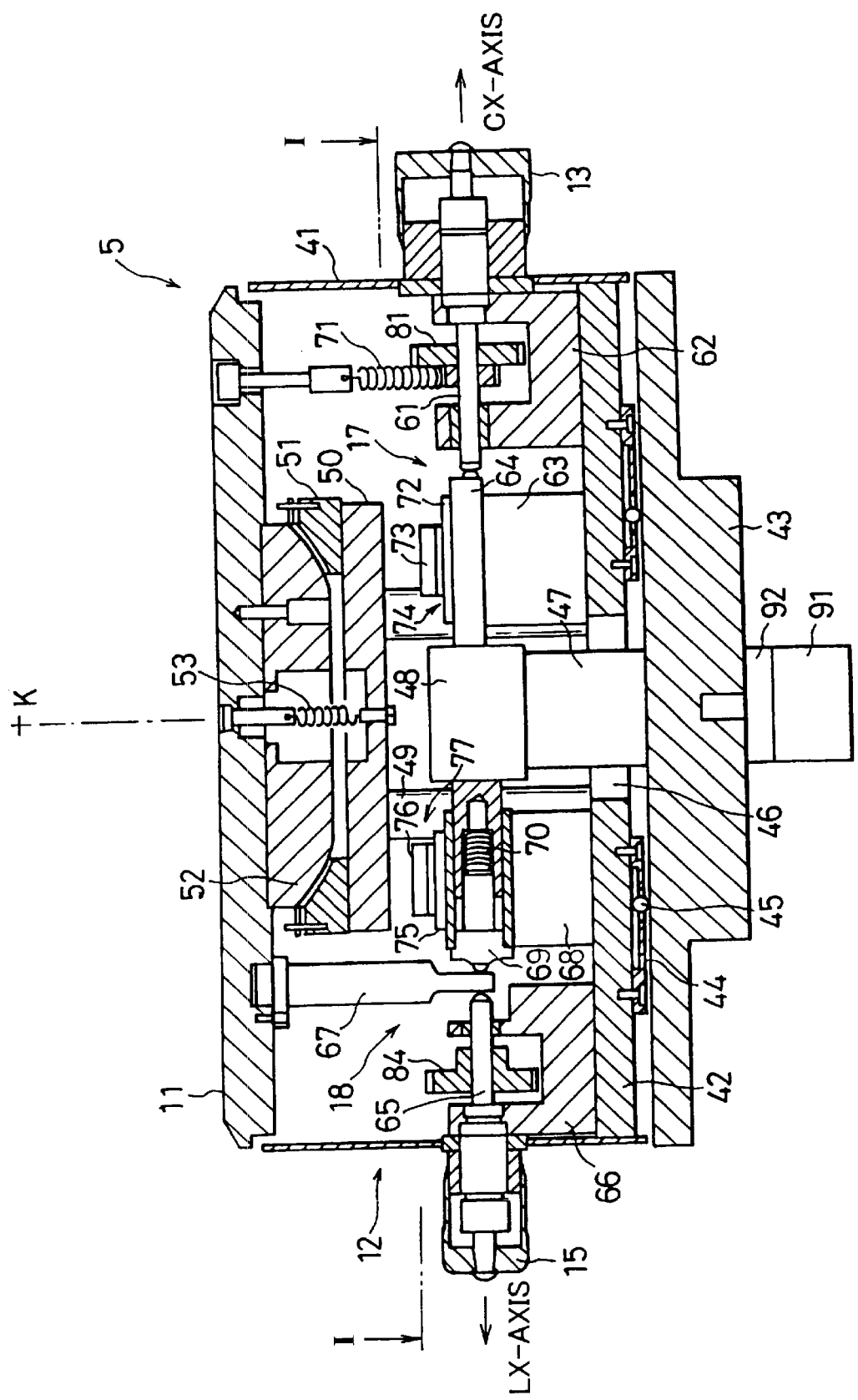
FIG. 2 is a vertical cross-sectional view of the centering table in the same roundness measuring apparatus.
Figure 3:
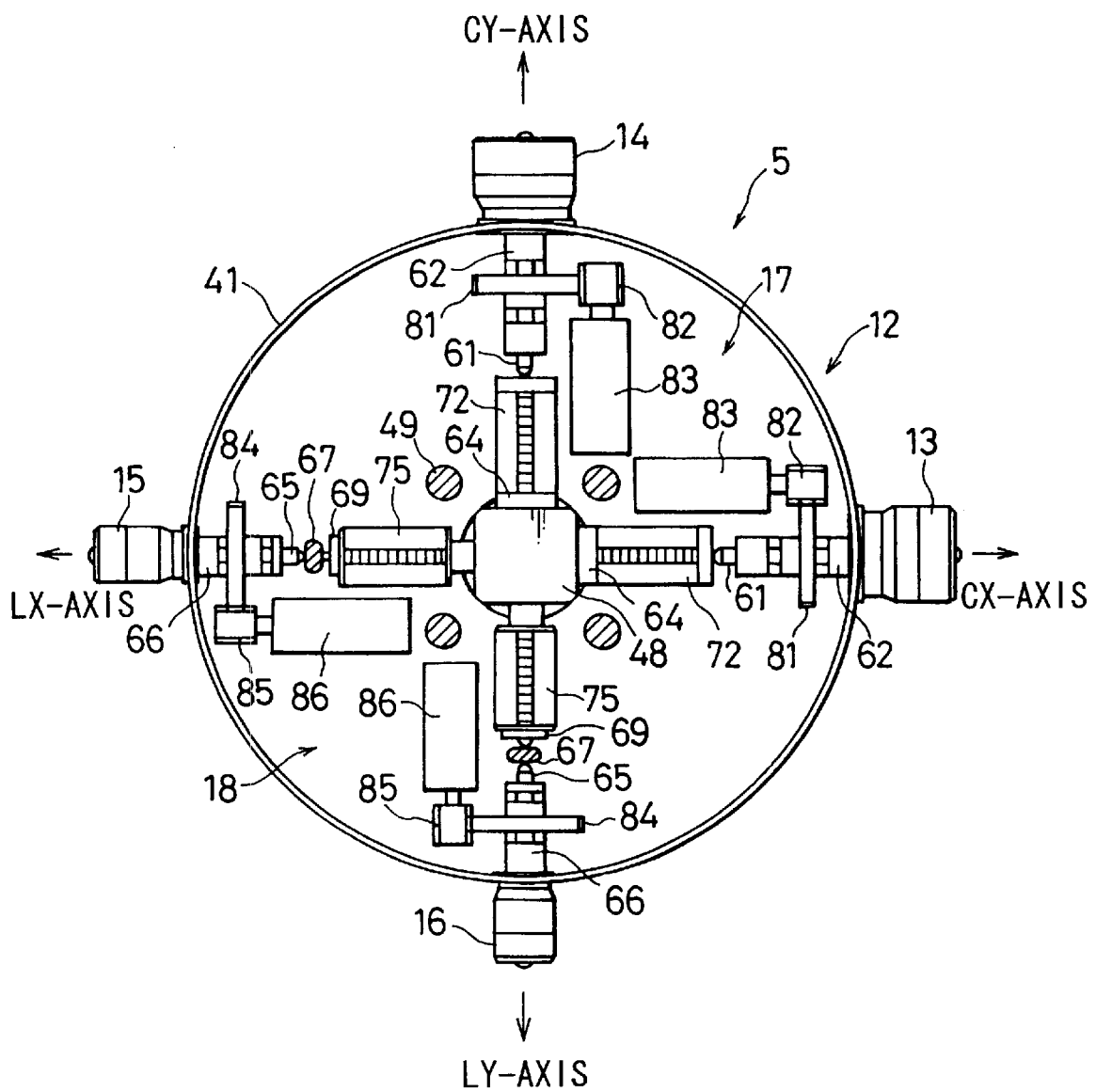
FIG. 3 is a cross-sectional view of the centering table taken along an I—I line and seen in the arrowhead direction in FIG. 2.

FIG 2 is a vertical cross-sectional view of the centering table 5 and FIG. 3 is a cross-sectional view taken along an I—I line and seen in the arrowhead direction in FIG. 2.

The centering table 5 is configured to include the table 11 for receiving the work 4 mounted thereon, the rotational driver 12 for rotationally driving the work 4, and additionally eccentricity adjusting device 17 and tilt adjusting device 18 configured inside the rotational driver 12. The rotational driver 12 also comprises a tubular side wall 41 having an upper end covered with the table 11, a movable base 42 for closing the lower end of the wall, and a rotary base 43 for rotationally driving these parts. The movable base 42 is supported on the rotary base 43 via hard balls 45 that are supported in a retainer 44. This allows the most of the entire centering table 5 to move in any directions in a horizontal plane.

A central bore 46 is formed in the center of the movable base 42. A rotary shaft 47, projected from the center of the rotary base 43 upwardly, passes through the central bore 46 remaining a certain gap therebetween. A rectangular piece 48 is provided on the upper end of the rotary shaft 47. Four joining rods 49 are provided on the movable base 42 around the rotary shaft 47. A disk-like tilt base 50 is supported on upper ends of the joining rods 49. A tilt ring 51 having a spherical recess formed therein is secured on the tilt base 50 and the table 11 is mounted on the tilt ring 51. A spherical protrusion 52, matching the spherical recess of the tilt ring 51, is provided on the lower surface of the table 11. A spring 53 is provided between the center of the lower surface of the table 11 and the center of the tilt base 50 to apply a resilient bias therebetween. When the table 11 varies its location along the spherical surface, a tilt of the table 11 can be adjusted.

The eccentricity adjusting device 17 has the following configuration. As shown in FIG. 3, the centering knobs 13 and 14 are provided to manually adjust eccentricities along CX- and CY-axes that are eccentricity adjusting axes (CX-axis and CY-axis are normal to each other). A spindle 61 is provided on the tip of the centering knob 13 and extends along CX-axis. The spindle 61 is rotatably supported in a support 62 and moves laterally when the centering knob 13 rotates like a micrometer head. The tip of the spindle 61 contacts a movable portion 64 of a linear guide 63. The tip of the movable portion 64 contacts the piece 48 on the upper end of the rotary shaft 47. The spindle 61 is coupled to a rotary shaft of a stepping motor 83 via non-backlash gears 81 and 82 so as to allow the stepping motor 83 to drive control the spindle 61. The centering knob 14 also has the same configuration as above.

The tilt adjusting device 18 has the following configuration. As shown in FIG. 3, the leveling knobs 15 and 16 are provided to manually adjust tilts along LX- and LY-axes that are tilt adjusting axes (LX-axis and LY-axis are normal to each other). A spindle 65 is provided on the tip of the leveling knob 15 and extends along LX-axis as well. The spindle 65 is rotatably supported in a support 66 and moves laterally when the leveling knob 15 rotates like a micrometer head. The tip of the spindle 65 opposes to a movable portion 69 of a linear guide 68 sandwiching therebetween a tilt manipulating bar 67 that extends downwardly from the lower surface of table 11. The movable portion 69 has a double tubular structure driven by a spring 70 in extensible. The tip of the movable portion 69 resiliently presses the piece 48. A spring 71 applies a resilient bias downwardly onto the side of the table 11 opposite to the tilt manipulating bar 67. The spindle 65 is coupled to a rotary shaft of a stepping motor 86 via non-backlash gears 84 and 85 so as to allow the stepping motor 86 to drive control the spindle 65. The leveling knob 16 also has the same configuration as above.

A main scale 72 is secured on the upper surface of the movable portion 64 of the linear guide 63. An index scale 73 is secured on the movable base 42 such that it opposes downwardly to the main scale 72. These scales 72 and 73 configure a linear encoder 74 that serves as means for detecting an eccentricity. A main scale 75 is secured on the upper surface of the movable portion 69 of the linear guide 68. An index scale 76 is secured on the movable base 42 such that it opposes downwardly to the main scale 75. These scales configure another linear encoder 77 that serves as means for detecting a tilt. These linear encoders 74 and 77 can detect adjusted amounts in CX- and CY-axes as well as in LX- and LY-axes. The centering knob 14 and leveling knob 16 have the same configurations as those of the centering knob 13 and leveling knob 15.

Rotational driving means or motor 91, having a rotary shaft coupled to the lower surface of the rotary base 43, rotationally drives the whole centering table 5. A rotary encoder 92 is coupled to the rotary shaft of the motor 91 to detect a rotational angle of the centering table 5.

Figure 4:
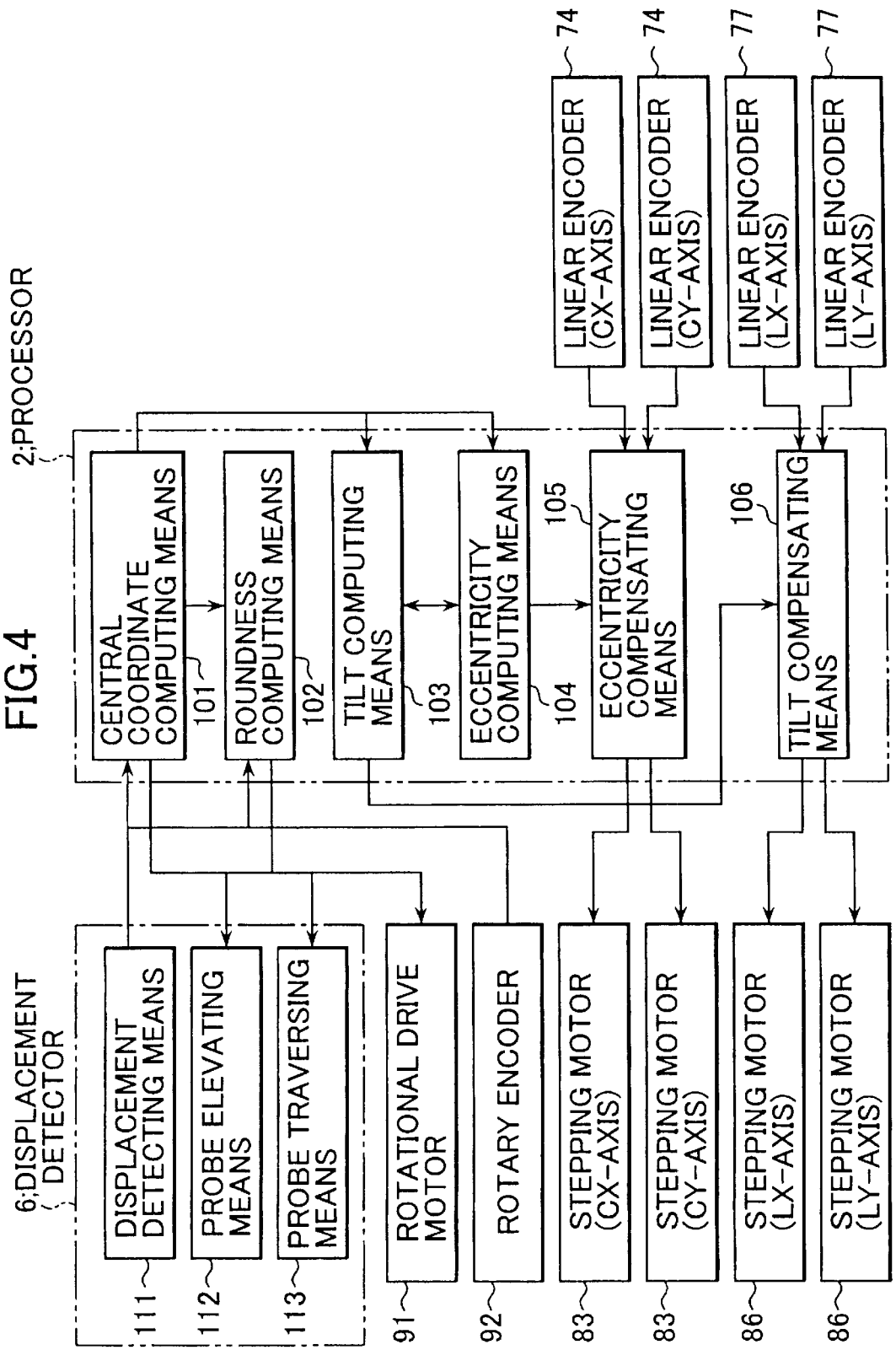
FIG. 4 is a block diagram showing flows of signals and information in the same roundness measuring apparatus.

FIG. 4 is a block diagram showing flows of signals and information in the roundness measuring apparatus. The processor 2 includes such internal functions as central coordinate computing means 101, roundness computing means 102, tilt computing means 103, eccentricity computing means 104, eccentricity compensating means 105 and tilt compensating means 106. The displacement detector 6 includes displacement detecting means 111 for detecting displacements on the surface of the work 4 using the probe 24 that traces the surface of the work 4. It also includes probe elevating means 112 for upward/downward driving the probe 24 and probe traversing means 113 for forward/backward driving the probe 24. The central coordinate computing means 101 and roundness computing means 102 drive control the probe elevating means 112 and probe traversing means 113 in the displacement detector 6 and the motor 91 for rotationally driving the centering table 5 to collect measured data from the displacement detecting means 111. They also collect an output from the rotary encoder 92, which corresponds to the measured data and indicates the rotational angle of the centering table 5. The central coordinate computing means 101 computes central coordinates of the work 4 from these data and outputs them to the roundness computing means 102, tilt computing means 103 and eccentricity computing means 104. The roundness computing means 102 computes a roundness of the work 4 based on the data input. The tilt computing means 103 and eccentricity computing means 104 respectively compute a tilt of and an eccentricity in the work 4 based on the central coordinates obtained at the central coordinate computing means 101.

The eccentricity compensating means 105 drives the stepping motors 83 (CX-axis) and 83 (CY-axis) based on the eccentricity from the eccentricity computing means 104 and receives the data of movements from the linear encoders 74 (CX-axis) and 74 (CY-axis) to drive control the stepping motors 83. The tilt compensating means 106 drives the stepping motors 86 (LX-axis) and 86 (LY-axis) based on the tilt from the tilt computing means 103 and receives the data of movements from the linear encoders 77 (LX-axis) and 77 (LY-axis) to drive control the stepping motors 86.

Figure 5:
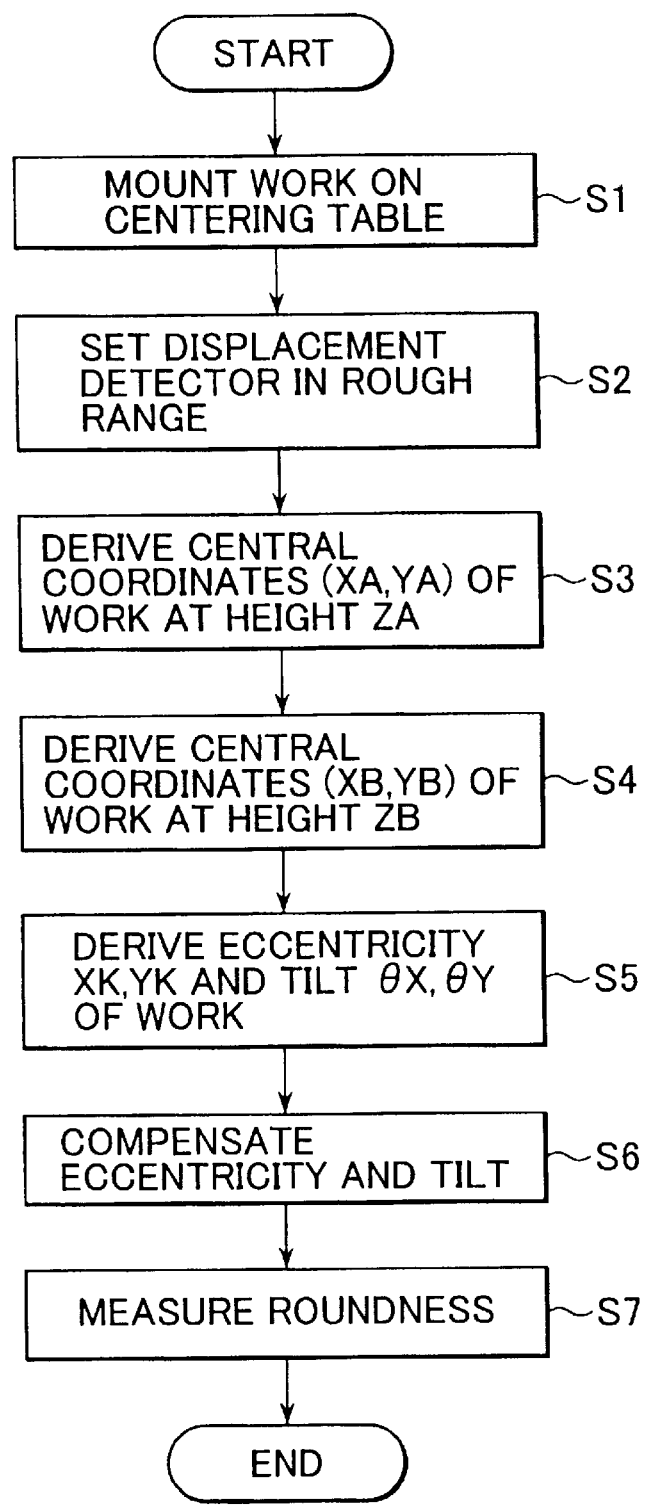
FIG. 5 is a flow chart illustrating a method of measurement with the same roundness measuring apparatus.

A roundness measuring method using the roundness measuring apparatus thus configured will be described next. FIG. 5 is a flow chart illustrating a procedure of a roundness measurement. First, the work 4 is mounted on the table 11 of the centering table 5 at a position visually confirmed near the center thereof (S1). Then, the displacement detector 6 is set in the roughest range (S2). Next, the probe elevating means 112 drives the slider 22 to set the position of the tip of the probe 24 in Z-axis to ZA in FIG. 6. In addition, the probe traversing means 113 contacts the tip of the probe 24 to a circumferential surface of the work 4 to be measured. Then, the motor 91 rotates the centering table 51 one turn while the central coordinate computing means 101 in the processor 2 collects displacement data from the displacement detector 6 as measured data. The central coordinate computing means 101 computes X-Y coordinates (XA, YA) of the work at the height of ZA (S3). Subsequently, the probe elevating means 112 drives the slider 22 to set the position of the tip of the probe 24 in Z-axis to ZB in FIG. 6. In addition, the probe traversing means 113 contacts the tip of the probe 24 to a circumferential surface of the work 4 to be measured. Then, the motor 91 rotates the centering table 5 one turn while the central coordinate computing means 101 in the processor 2 collects displacement data from the displacement detector 6 as measured data. The central coordinate computing means 101 computes X-Y coordinates (XB, YB) of the work at the height of ZB (S4).

Figure 6:
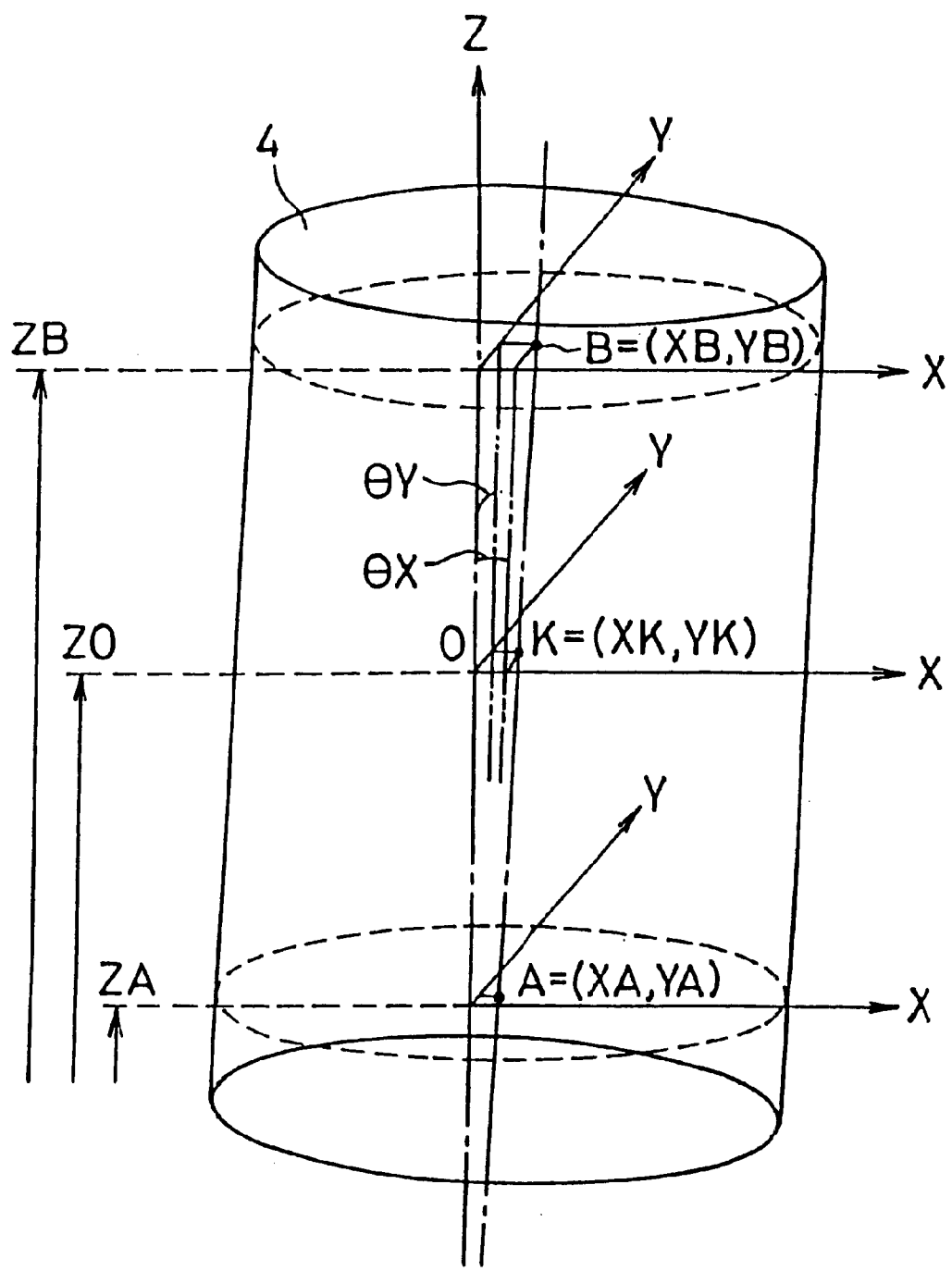
FIG. 6 illustrates a method of computing an eccentricity and tilt in the same method of measurement.

Once X-Y coordinate values of the central points A, B in the work 4 at the heights of ZA, ZB are obtained, the eccentricity computing means 104 and tilt computing means 103 in the processor 2 derive an eccentricity and tilt of the work 4 from these coordinate values (S5). It is assumed that the spherical protrusion 52 and the spherical recess in the tilt ring 51 shown in FIG. 2 have the spherical center of K, which has X-Y coordinate values of (XK, YK) and a height of ZO along Z-axis as shown in FIG. 6. Then a point O at the height of ZO on the rotational axis of the motor 91 comes to the leveling center. When the leveling center O is assumed to have X-Y coordinate values of (0, 0), the eccentricity becomes (XK, YK) and, as obvious from reference to FIGS. 7A–B, it can be obtained as follows:

$$XK=XA+(ZO-ZA)(XB-XA)/(ZB-ZA)$$

$$YK=YA+(ZO-ZA)(YB-YA)/(ZB-ZA) \quad \ldots (1)$$

Figure 7A:
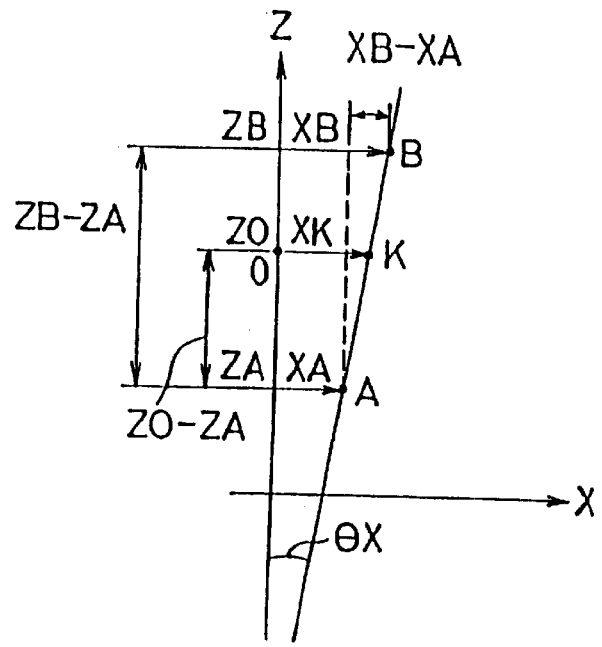
FIG. 7A illustrates a method of computing an eccentricity and tilt in the same method of measurement.
Figure 7B:
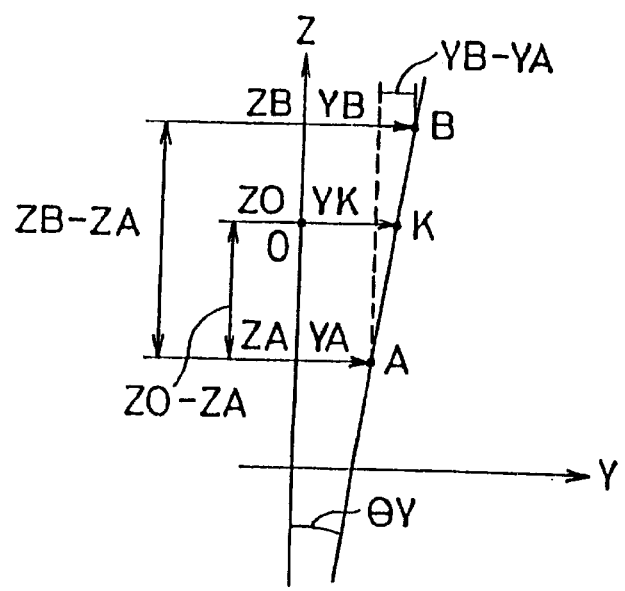
FIG. 7B illustrates a method of computing an eccentricity and tilt in the same method of measurement.

As for the tilt θX, θY, as obvious from reference to FIGS. 7A–B, it can be obtained as follows:

$$\theta X=\tan^{-1}\{(XB-XA)/(ZB-ZA)\}$$

$$\theta Y=\tan^{-1}\{(YB-YA)/(ZB-ZA)\} \quad \ldots (2)$$

Once the eccentricity (XK, YK) and tilt θX, θY are obtained, the eccentricity compensating means 105 and tilt compensating means 106 in the processor 2 drive the stepping motors 83, 86 so as to minimize the above eccentricity and tilt to compensate them (S6). When the stepping motors 83 are driven, their rotational driving forces are transmitted to the spindle 61 via the non-backlash gears 82 and 81, thereby moving the tip of the spindle 61 forward/backward to drive the movable portion 64 of the linear guide 63 along CX- and CY-axes. The tip of the movable portion 64 is driven by spring repulsion from the spring 70 to contact the piece 48. The piece 48 is fixed on the rotary base 43 and the movable base 42 travels along CX- and CY-axes instead, thereby compensating the eccentricity XK, YK. When the stepping motors 86 are driven, their rotational driving forces are transmitted to the spindle 65 via the non-backlash gears 85 and 84 to move the tip of the spindle 65 forward/backward. The tip of the spindle 65 drives the movable portion 69 of the linear guide 68 forward/backward along LX- and LY-axes via the tilt manipulating bar 67 to compress or expand the spring 70. As a result, the tilt manipulating bar 67 travels forward/backward along LX- and LY-axes and rotates the table 11 about the spherical center K to incline it.

The linear encoders 74 and 77 detect each amount of movements along CX-, CY-, LX- and LY-axes and feedback them to the processor 2. The eccentricity compensating means 105 and tilt compensating means 106 in the processor 2 stop to drive the stepping motors 83 and 86 when the feedback amount of movement along each axis reaches the eccentricity and tilt obtained. Through the above operations, the centering and leveling are finished. After setting the range of the displacement detector 6 in an appropriate range, the roundness measuring means 102 then starts a roundness measurement (S7).

As obvious from the forgoing, in accordance with the present invention, the eccentricity adjusting motor and tilt eccentricity adjusting motor are respectively provided in the means for adjusting the eccentricity in the work and means for adjusting the tilt of the work. In addition, the eccentricity/tilt compensating means drives these motors on the basis of the eccentricity and tilt of the work obtained by the computing means to compensate the eccentricity and tilt of the work. This prevents any sophisticated manual operations and matching errors on manual operations from occurring and can improve the operability and matching precision effectively.

In a roundness measuring apparatus according to a second embodiment of the present invention, each amount of movements along CX-, CY-, LX- and LY-axes detected by the linear encoders 74 and 77 is displayed on the display 32 of the processor 2. The eccentricity and tilt, computed by the eccentricity computing means and tilt computing means, are also displayed on the display 32 as amounts of eccentric compensation (centering) and tilt compensation (leveling). Therefore, precise centering and leveling can be performed even manually through manipulation of the centering knobs 13, 14 and leveling knobs 15, 16 such that the detected amounts of movements match the respective amounts of eccentric compensation and tilt compensation. Thus, it is possible to reduce preparation activities prior to the actual measurement and to improve an efficiency of a measurement.

A roundness measuring apparatus according to a third embodiment of the present invention will be described next. In such the roundness measuring apparatus, the X- and Y-axes assumed computationally are sometimes not coincident with the operational directions of centering and leveling (CX-, CY-, LX- and LY-axes). The computationally assumed X- and Y-axes (angular references) comprise a direction of 0-degree detected by the rotary encoder in the rotational mechanism for the table and a direction normal thereto. A lot of task steps is required to assemble the table (the centering table) so that the CX- and LX- axes and CY- and LY-axes of the mechanisms for centering and leveling match the above X- and Y-axes accurately, leaving a slight angular error in general. In such the case, it is not easy to reach a target precision for centering and leveling without time-consuming repetition of centering and leveling. The present embodiment is intended to improve this problem. The same parts in this embodiment as those already descried above are omitted to describe again while giving them the same reference numerals. In this embodiment, the roundness measuring apparatus also has the same overview and configuration as above (FIG. 1–3).

Figure 8:
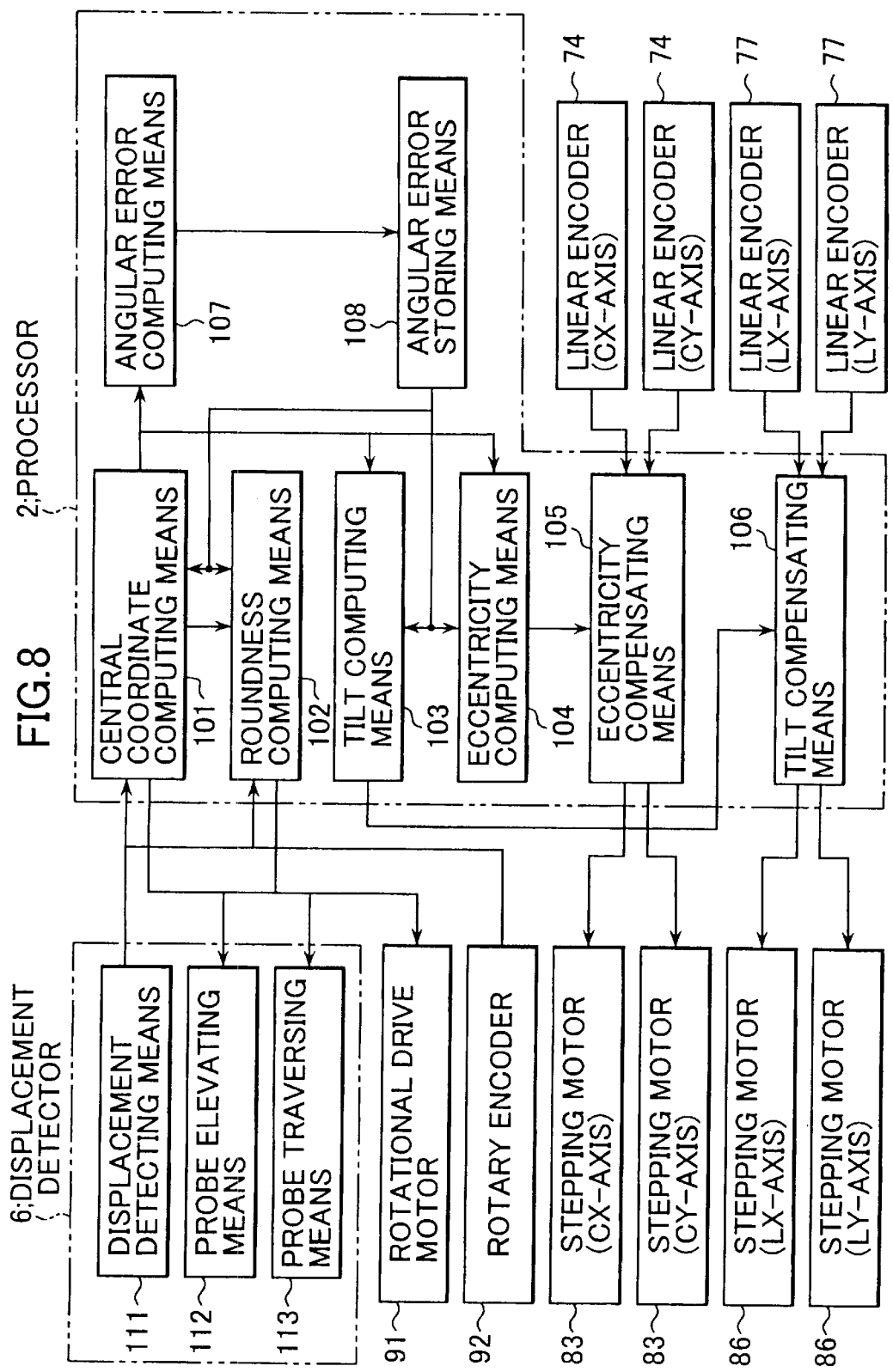
FIG. 8 is a block diagram showing flows of signals and information in a roundness measuring apparatus according to a third embodiment of the present invention.

FIG. 8 is a block diagram showing flows of signals and information in the roundness measuring apparatus according to the present embodiment. The processor 2 includes such internal functions as central coordinate computing means 101, roundness computing means 102, tilt computing means 103, eccentricity computing means 104, eccentricity compensating means 105 and tilt compensating means 106. The processor 2 additionally includes angular error computing means 107 and angular error storing means 108. The central coordinate computing means 101 computes central coordinates of the work 4 from these data and outputs them to the roundness computing means 102, tilt computing means 103, eccentricity computing means 104 and angular error computing means 107. The angular error computing means 107 computes an angular error between the angular reference (0-degree) of the rotary encoder 92 and CX-axis. The angular error storing means 108 comprises a non-volatile memory such as an EEPROM to store the angular error obtained. The tilt computing means 103 and eccentricity computing means 104 respectively compute an eccentricity and tilt of the work on the basis of the central coordinates obtained at the central coordinate computing means 101 and of the angular error stored in the angular error storing means 108. The other block in FIG. 8 also has the same configuration as shown in FIG. 4.

Figure 9:
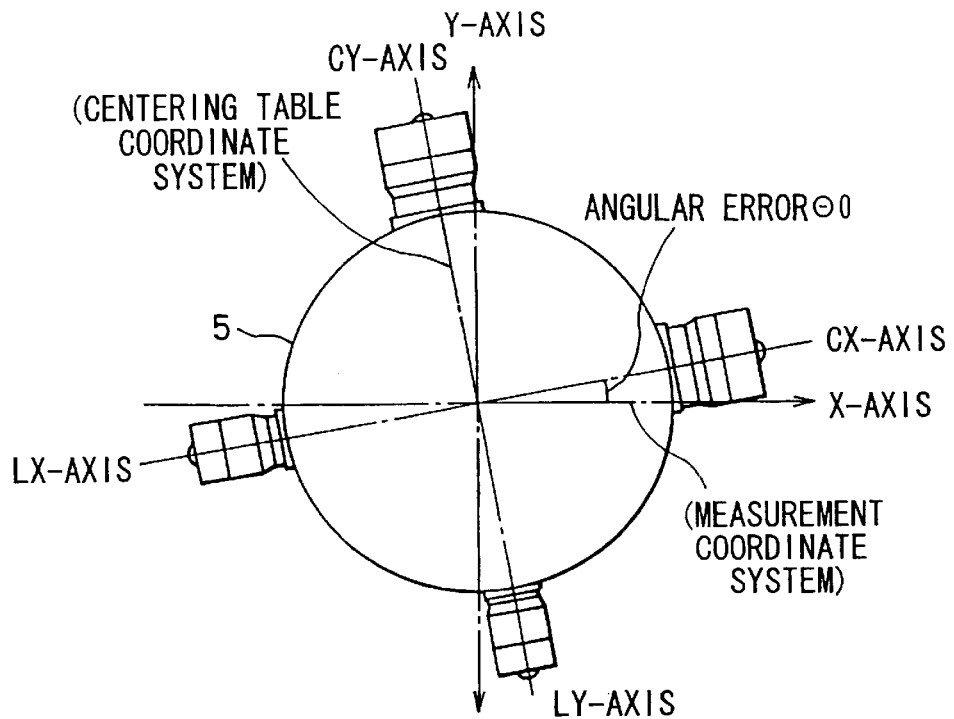
FIG. 9 illustrates an angular error in the same roundness measuring apparatus.

A roundness measuring method using thus configured roundness measuring apparatus will be described next. FIG. 9 illustrates an angular error of a coordinate system (CX, CY, LX, LY) of the centering table 5 to a measurement coordinate system X, Y on the basis of the angular reference of the rotary encoder 92. Strictly speaking, the centering directions CX, CY and leveling directions LX, LY respectively have individual angular errors relative to the measurement coordinate system X, Y. In the interests of simplicity, however, it is herein assumed that CX- and CY-axes are not deviated from LX- and CY-axes and that CX- and CY-axes respectively cross LX- and CY-axes completely at right angle on the origin of the measurement coordinate system. Thus, the angular error θ0 is represented by an angle between X-axis of the measurement coordinate system and CX-axis of the centering table 5.

Figure 10:
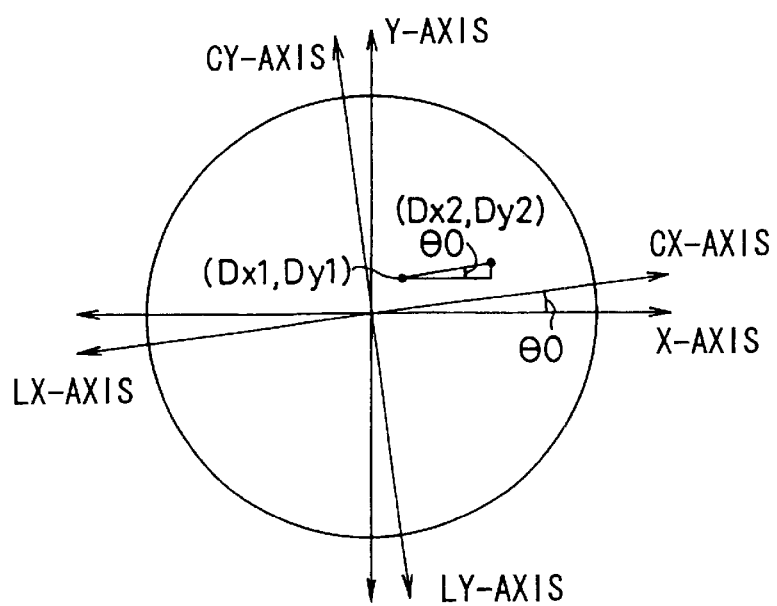
FIG. 10 illustrates a method of measuring the angular error.

FIG. 10 illustrates a method of obtaining the angular error θ0. As depicted, when the work 4 is moved in the direction of CX-axis, eccentricities (Dx1, Dy1) and (Dx2, Dy2) of the center of the work 4, before and after the movement, to the measurement coordinate system X, Y, can be measured. Thus, the angular error θ0 can be derived from the following equation:

$$\theta 0 = \tan^{-1}\{(Dy2-Dy1)/(Dx2-Dx1)\} \quad \ldots (3)$$

Figure 11:
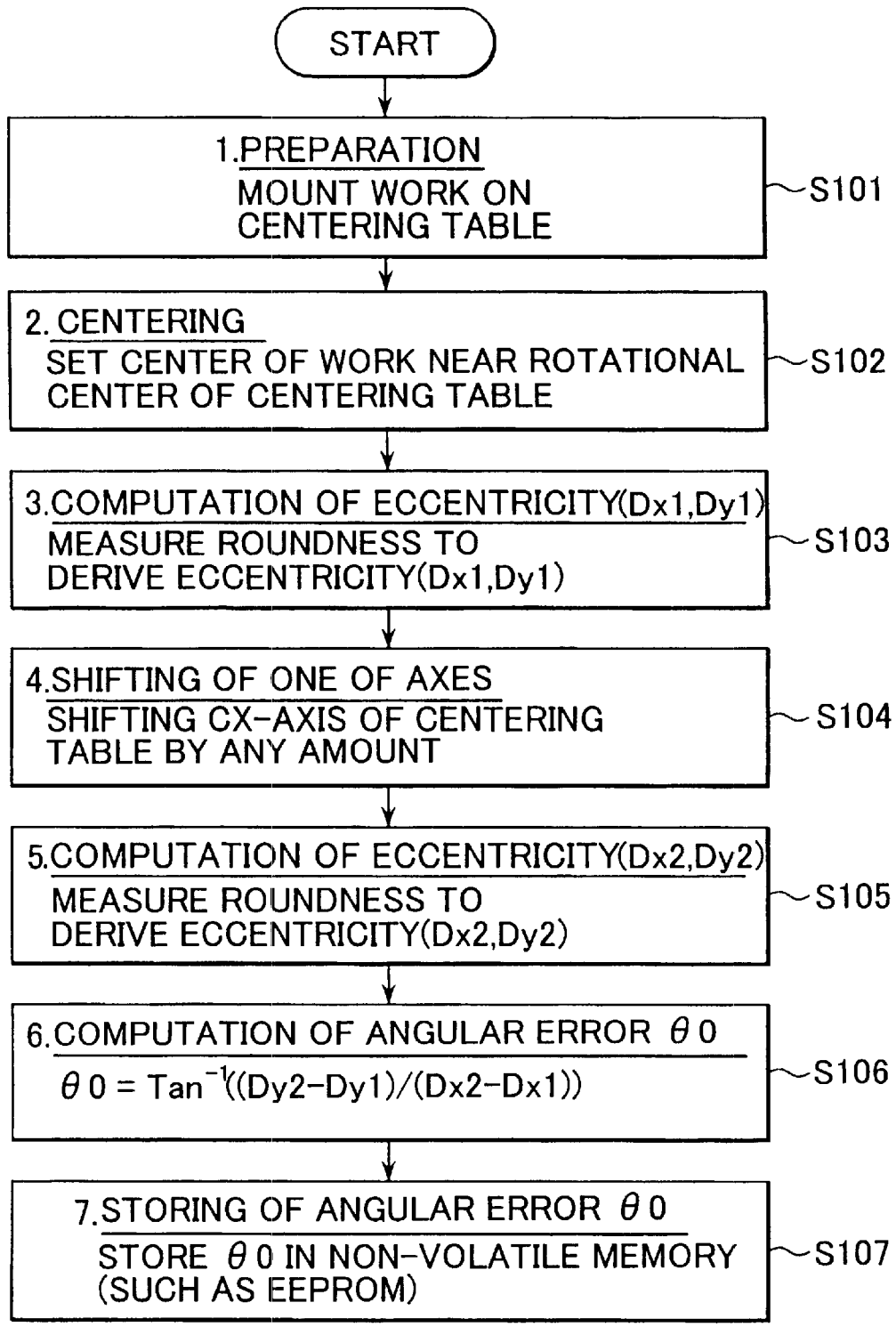
FIG. 11 is a flow chart showing a procedure of computing and storing the angular error.

FIG. 11 is a flow chart showing a procedure of computing and storing the angular error First, the work 4 is mounted on the table 11 of the centering table 5 (S101). Then, the center of the work 4 is positioned visually near the rotational center of the centering table 5 with manipulating the centering knobs 13, 14 (S102). Next, the tip of the probe 24 of the displacement detector 6 is directed to contact a circumferential surface of the work 4 to be measured. Then, the motor 91 rotates the centering table 51 one turn while the central coordinate computing means 101 in the processor 2 collects displacement data from the displacement detector 6 as measured data. The central coordinate computing means 101 computes central coordinates of the work 4 as an eccentricity (Dx1, Dy1) (S103). Next, the centering table 5 is shifted any amount along one of axes, for example, CX-axis to repeat the same roundness measurement as above (S104). The central coordinate computing means 101 computes central coordinates of the work 4 as another eccentricity (Dx2, Dy2) (S105). The angular error θ0 can be derived from the eccentricities (Dx1, Dy1) and (Dx2, Dy2) based on the equation (3) (S106). The angular error θ0 is stored in a non-volatile memory such as an EEPROM or in an external storage such as a hard disc and a floppy disc (S107).

Attention is now directed to centering operations, which include a phase shift method that shifts the angular error θ0 previously in the angular direction and then performs centering; and a coordinate transformation method that computes an eccentricity in the measurement coordinate system inclined by the angular error θ0.

Figure 12:
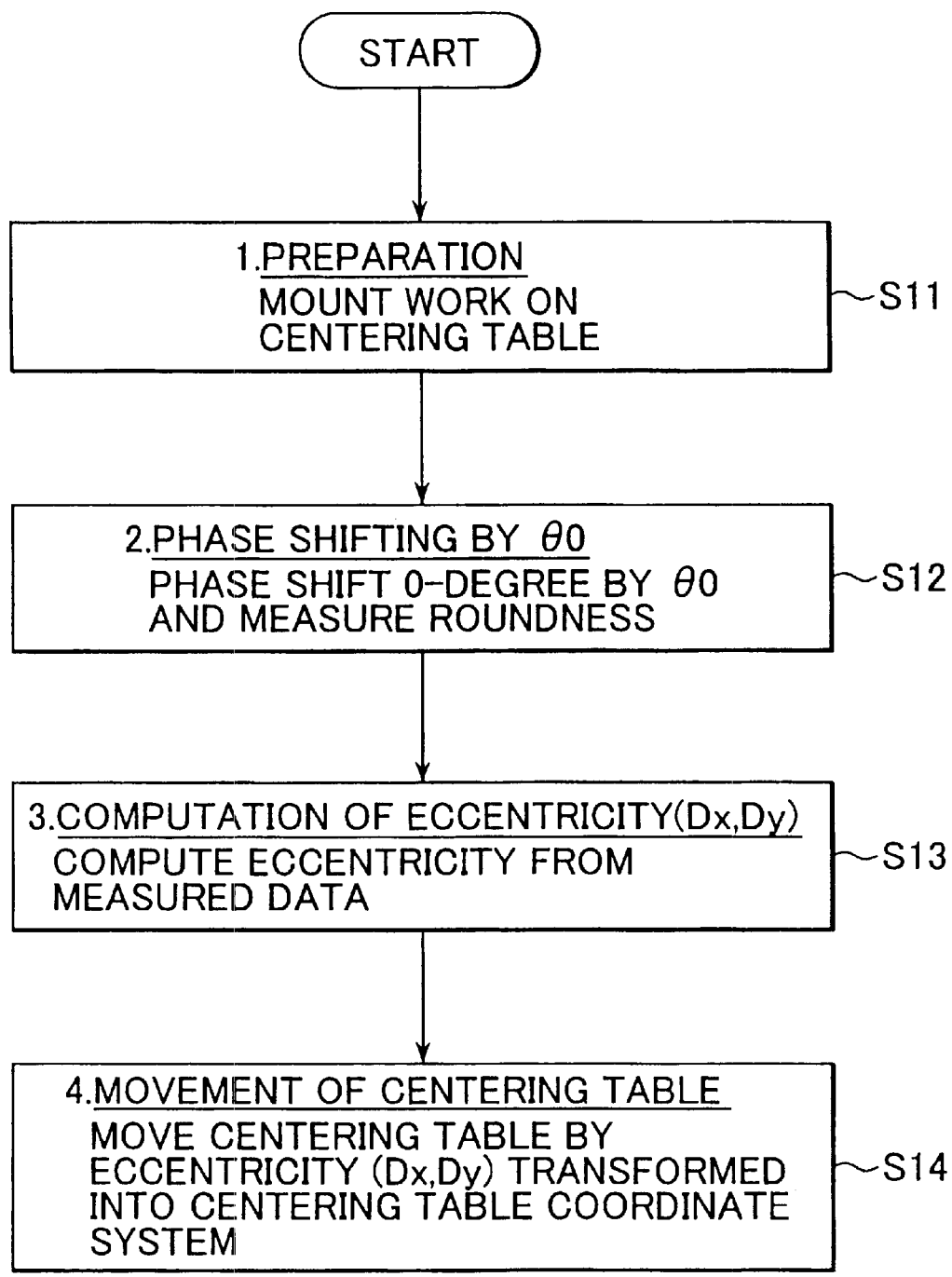
FIG. 12 is a flow chart showing a centering method using a phase shift method to compensate the angular error.

FIG. 12 is a flow chart showing a centering method according to the phase shift method.

First, the work 4 is mounted on the centering table 5 (S11). Then, phase shifting the measurement coordinate system by the angular error θ0, central coordinates of the work 4 are measured (S12). A relationship between a polar coordinate system (R, Q) and the measurement coordinate system P (r, q) in the centering table 5 is represented by:

$$R=r$$
$$Q=q+\theta 0 \quad (4)$$

Next, an eccentricity (Dx, Dy) transformed into the centering table coordinate system is computed (S13). Then, the centering table 5 is moved by the obtained eccentricity (Dx, Dy) (S14). This movement may be performed using the centering knobs 13, 14 that can be manually operated. Alternatively, it may be performed automatically using the stepping motors 83 that can be controlled from the eccentricity compensating means 105 in the processor 2.

Figure 13:
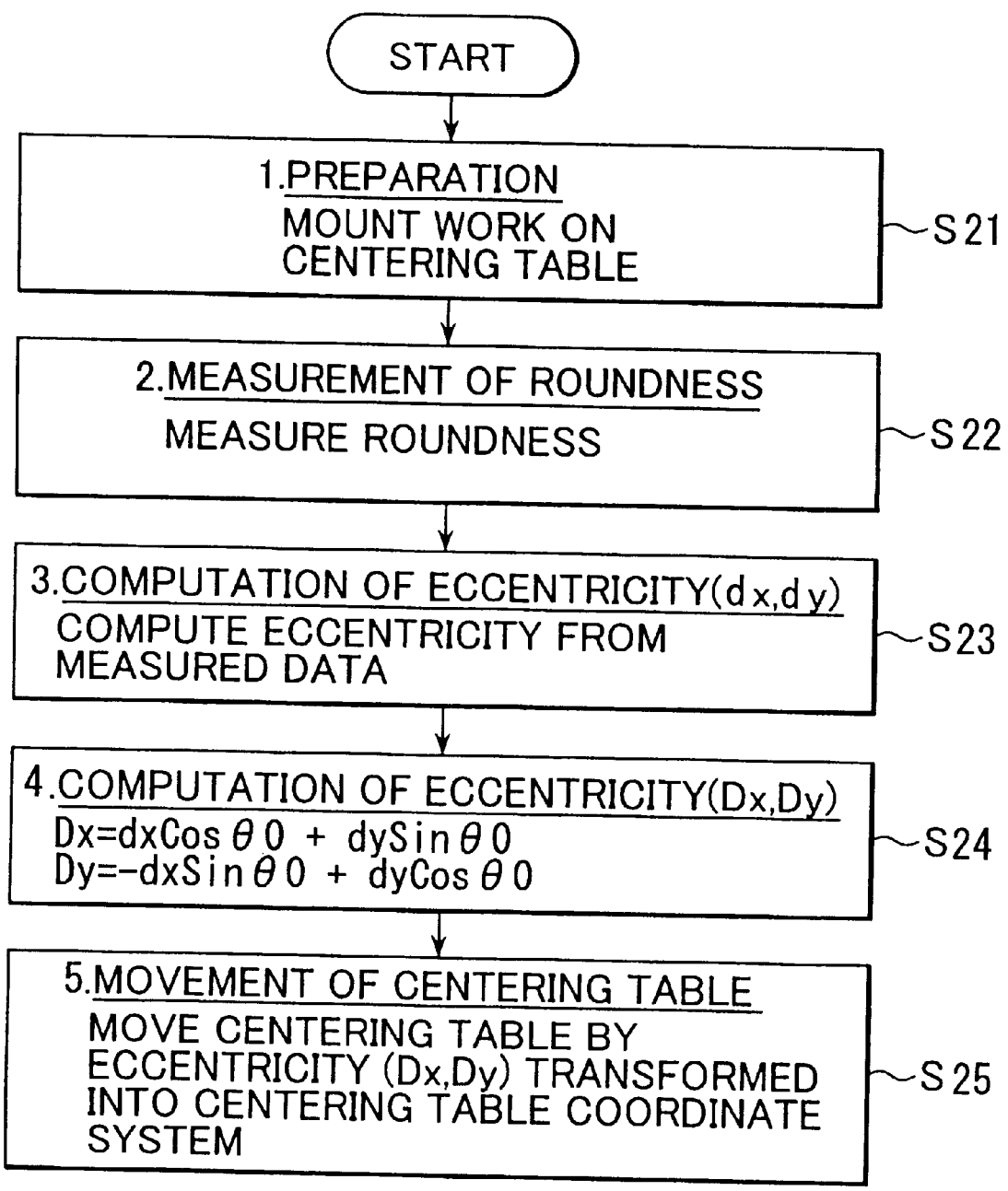
FIG. 13 is a flow chart showing a centering method using a coordinate transformation method to compensate the angular error.

FIG. 13 is a flow chart showing a centering method according to the coordinate transformation method.

Figure 14A:
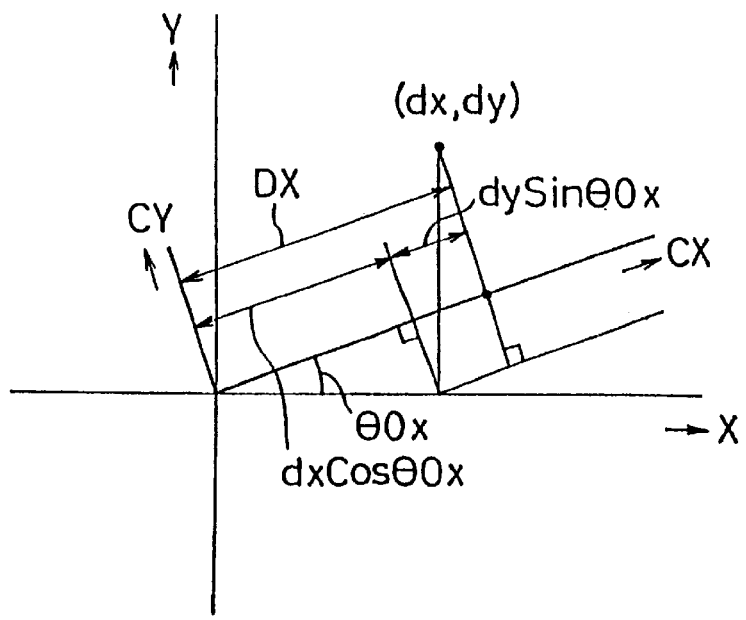
FIG. 14A illustrates the coordinate transformation method in the centering method of FIG. 13.
Figure 14B:
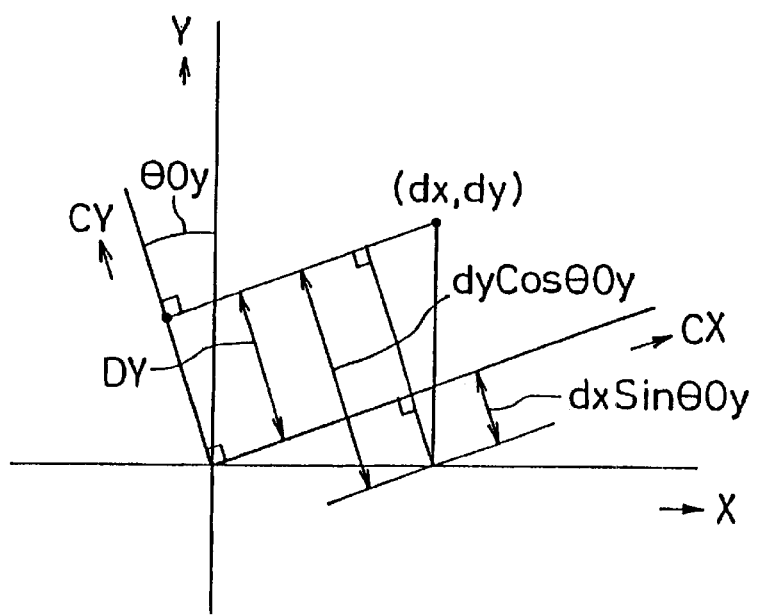
FIG. 14B illustrates the coordinate transformation method in the centering method of FIG. 13.

First, the work 4 is mounted on the centering table 5 (S21). Then a roundness of the work 4 is measured (S22). Central coordinates are computed from the measured result as an eccentricity (dx, dy) in the measurement coordinate system (S23). From the eccentricity (dx, dy), an eccentricity (Dx, Dy) in the centering table coordinate system is computed as shown in FIGS. 14A–B through the following coordinate transforming computation (S24). Then, the centering table 5 is moved by the obtained eccentricity (Dx, Dy) (S25).

$$Dx = dx \times \cos\theta 0 + dy \times \sin\theta 0$$

$$Dy = -dx \times \sin\theta 0 + dy \times \cos\theta 0 \qquad \ldots (5)$$

Attention is next directed to leveling operations. CX- and LX-axes are present on a straight line, and CY- and LY-axes are also present on a straight line. In addition, CX- and CY-axes respectively cross LX- and LY-axes at right angle. Therefore, angular compensation of CX- and CY-axes can inevitably compensate angles of LX- and LY-axes.

A tilt can be derived from two sets of central coordinates of the work 4, A (XA, YA) and B(XB, YB), obtained at two different points along the height (Z-axis) of the work 4, similar to the equation (2) in the above first embodiment.

As for leveling operations, the phase shift method and coordinate transformation method can be applied as well.

Figure 15:
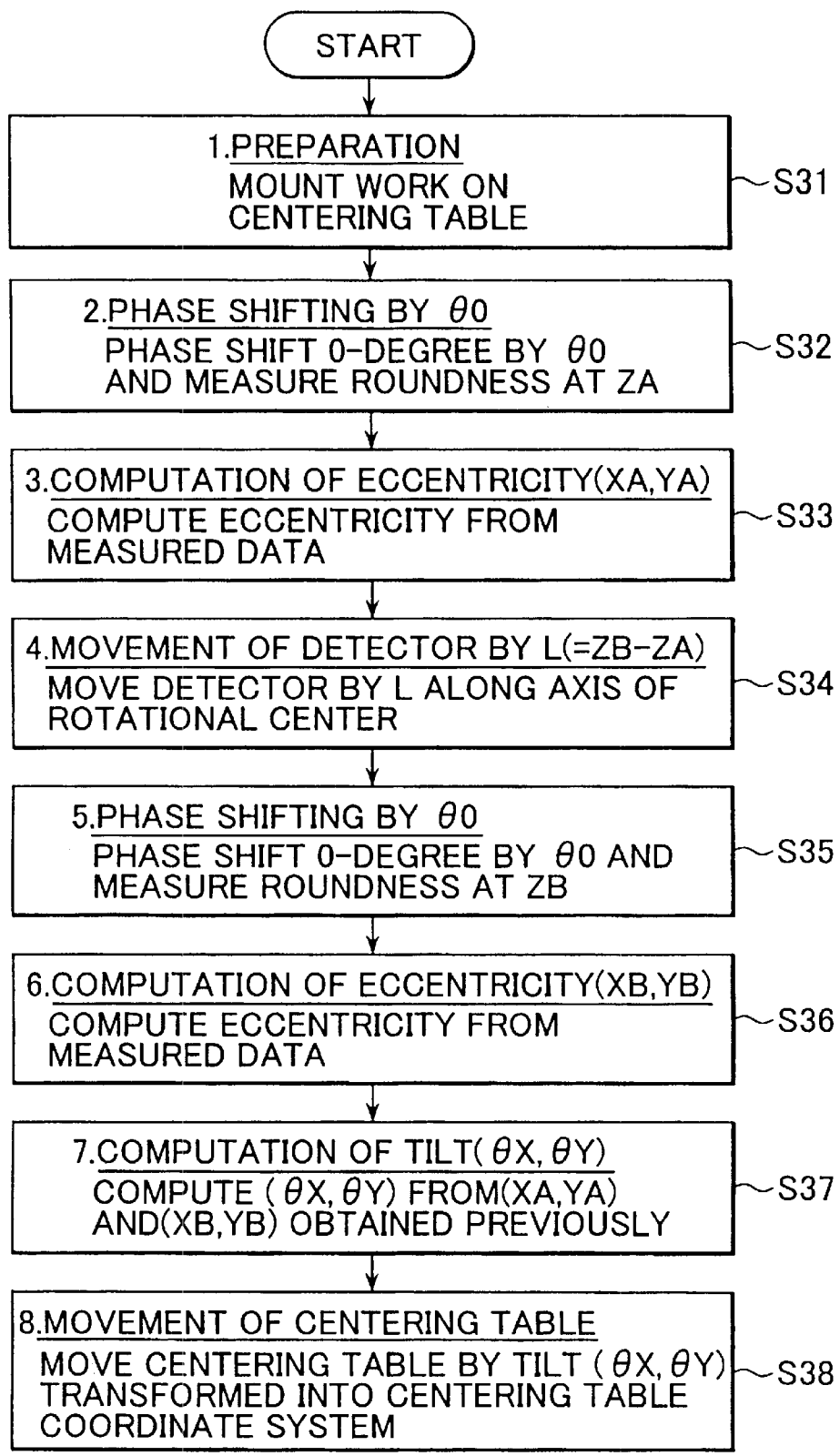
FIG. 15 is a flow chart showing a leveling method using the phase shift method to compensate the angular error.

FIG. 15 is a flow chart showing a leveling method using the phase shift method.

First, the work 4 is mounted on the centering table 5 (S31). Then, phase shifting the measurement coordinate system by the angular error $\theta 0$, it is transformed into the coordinate system of the centering table 5. Thereafter, the probe elevating means 112 drives the slider 22 to set the position of the tip of the probe 24 along the Z-axis to ZA in FIG. 6. In addition, the probe traversing means 113 contacts the tip of the probe 24 with a circumferential surface of the work 4 to be measured. Then, the motor 91 rotates the centering table 51 one turn to measure a roundness (S32). The central coordinate computing means 101 in the processor 2 obtains displacement data from the displacement detector 6 as measured data and computes X-Y coordinates (XA, YA) of the center A in the work 4 along the height ZA as an eccentricity (S33). Subsequently, the probe elevating means 112 drives the slider 22 by L=ZB−ZA to set the position of the tip of the probe 24 along the Z-axis to ZB in FIG. 6 (S34). In addition, the probe traversing means 113 contacts the tip of the probe 24 with a circumferential surface of the work 4 to be measured. Then, the motor 91 rotates the centering table 51 one turn to measure a roundness (S35). The central coordinate computing means 101 in the processor 2 obtains displacement data from the displacement detector 6 as measured data and computes X-Y coordinates (XB, YB) of the center B in the work 4 along the height ZB as another eccentricity (S36).

Once X-Y coordinates of the central points A, B at the heights ZA, ZB are determined, the tilt computing means 103 in the processor 2 computes a tilt ($\theta X$, $\theta Y$) in accordance with the equation (2) (S37). Once the tilt ($\theta X$, $\theta Y$) is determined, the tilt compensating means 106 in the processor 2 compensates the tilt to minimize it in manual operation or by driving the stepping motors 86 (S38).

Figure 16:
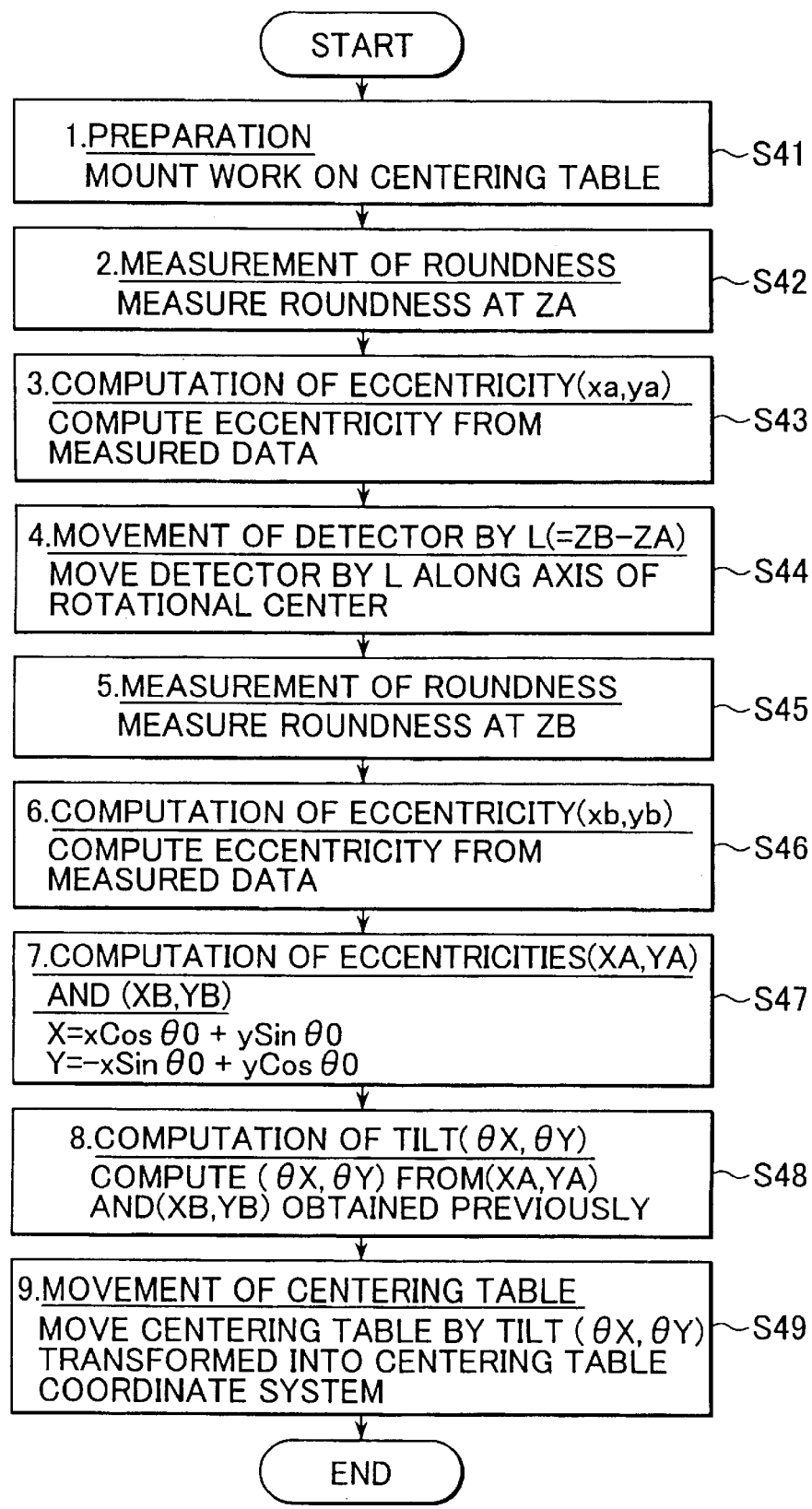
FIG. 16 is a flow chart showing a leveling method using the coordinate transformation method to compensate the angular error.

FIG. 16 is a flow chart showing a leveling method using the coordinate transformation method.

First, the work 4 is mounted on the centering table 5 (S41). Then a roundness of the work 4 is measured at a height of ZA (S42). Central coordinates are computed from the measured result as an eccentricity (xa, ya) at the height ZA in the measurement coordinate system (S43). Next, the probe 24 is moved by L=ZB−ZA (S44) and a roundness of the work 4 is measured at a height of ZB (S45). Central coordinates are computed from the measured result as another eccentricity (xb, yb) of the work 4 at the height ZB in the measurement coordinate system (S46). From these eccentricities (xa, ya) and (xb, yb), eccentricities (XA, YA) and (XB, YB) in the centering table coordinate system are derived in accordance with the following coordinate transforming computation (S47). Then, a tilt ($\theta X$, $\theta Y$) of the work 4 is computed based on the eccentricities (XA, YA) and (XB, YB) thus obtained (S48) and the tilt of the centering table 5 is compensated (S49).

$$XA = xa \times \cos\theta 0 + ya \times \sin\theta 0$$

$$YA = -xa \times \sin\theta 0 + ya \times \cos\theta 0$$

$$XB = xb \times \cos\theta 0 + yb \times \sin\theta 0$$

$$YB = -xb \times \sin\theta 0 + yb \times \cos\theta 0 \qquad \ldots (6)$$

In the above embodiments, only the angular error $\theta 0$ between CX-axis and X-axis is determined in the interests of description, and as for others such as an angular error between CY-axis and Y-axis, it is assumed equal to an angular error between CX-axis and X-axis. Though, determinations of these angular errors can achieve a more accurate leveling. It is required in this case to repeat the steps in the flow chart shown in FIG. 11 twice: selecting CX-axis first and CY-axis second for "shifting of one of axes" in the step S4.

When it is required to determine angular errors of LX- and LY-axes individually, these LX- and LY-axes can be shifted separately. There is a slight restriction about the height of the probe 24 when LX- and LY-axes are operated to determine angular errors. If the height of the probe 24 is too close to the leveling point K, a sufficient eccentricity can not be obtained. Accordingly, it is required to select such a height of the probe 24 that is significantly apart from the leveling point K. This operation does not give an eccentricity mechanically, though a varied tilt can apparently yield the same effect as the eccentricity is given. The angular errors in the directions of centering ($\theta 0X$, $\theta 0Y$) and leveling ($\theta 1X$, $\theta 1Y$) thus obtained are stored in a non-volatile memory.

The phase shift method described above has a presumption that CX-axis crosses CY-axis at right angle. To the contrary, the coordinate transformation method can be applied to any cases even where CX-axis is not normal to CY-axis. In this case, an eccentricity (Dx, Dy) can be computed as follows:

$$Dx = dx \times \cos\theta 0X + dy \times \sin\theta 0X$$

$$Dy = -dx \times \sin\theta 0Y + dy \times \cos\theta 0Y \qquad \ldots (7)$$

where $\theta 0X$ denotes an angular error of X-axis to CX-axis; and $\theta 0Y$ an angular error of Y-axis to CY-axis.

Figure 17:
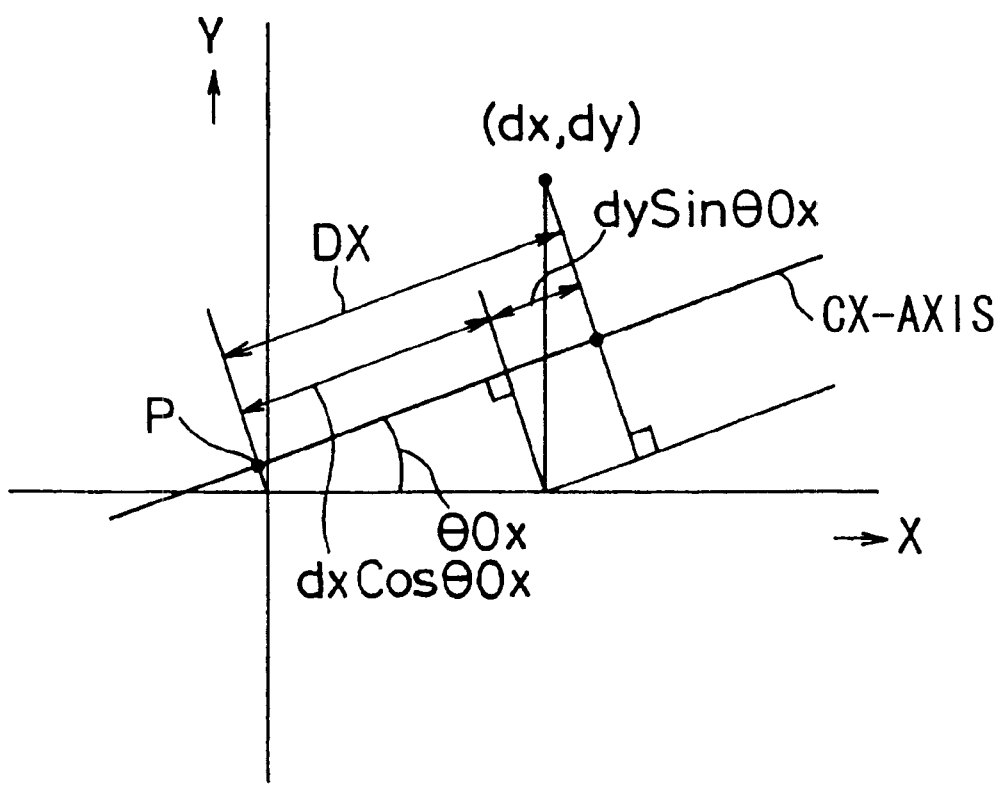
FIG. 17 illustrates a method of compensating an angular error, which contains an offset, using the coordinate transformation.

As for the case even where an angular error has not only an angular component but also an offset component, the equations described above can also be applied. As shown in FIG. 17, an amount of compensation, Dx, to a target point P is given from the equation (5). This point is a point where a normal, extending from a cross point between X-axis and Y-axis, meets CX-axis. Therefore, it is the point nearest to the rotational center on CX-axis. This is the same as is the case with CY-axis.

In the embodiments described above, the table 11 is rotational and is subjected to centering and leveling. If a roundness measuring apparatus is applied to measure a heavy, stationary work while the displacement detector 6 rotates instead, mechanisms for centering and leveling may be provided in a rotational mechanism on the detector side to compensate angular errors similarly.

As obvious from the forgoing, centering and leveling according to the present invention can be achieved precisely and effectively with a little quantity of operation in consideration of a previously obtained angular error between an angular reference of rotational driving means and an operational direction of centering or leveling operation.

Having described the embodiments consistent with the present invention, other embodiments and variations consistent with the invention will be apparent to those skilled in the art. Therefore, the invention should not be viewed as limited to the disclosed embodiments but rather should be viewed as limited only by the spirit and scope of the appended claims.

What is claimed is:

1. An apparatus for measuring roundness, comprising:
a table for receiving a work mounted thereon, said work having a circumferential surface with a roundness to be measured;
displacement detecting means for detecting displacements on said circumferential surface of said work;
rotational driving means for rotationally driving either said table or said displacement detecting means such that said displacement detecting means detects said displacements along said circumferential surface of said work;
eccentricity adjusting means for adjusting an eccentricity in said work, said eccentricity adjusting means including an eccentricity adjusting motor to move said table in a plane perpendicular to the rotational axis of said rotational driving means;
tilt adjusting means for adjusting a tilt of said work to said rotational axis, said tilt adjusting means including a tilt adjusting motor to incline said table;
computing means for calculating said eccentricity and tilt of said work from said displacements on said circumferential surface of said work detected by said displacement detecting means;
eccentricity/tilt compensating means for driving said eccentricity adjusting motor and tilt adjusting motor on the basis of said eccentricity and tilt obtained by said computing means to compensate said eccentricity and tilt; and
detecting means for detecting amounts of movements of said table in a plane perpendicular to said rotational axis and in a tilt direction about said rotational axis,
wherein said eccentricity/tilt compensating means drives said eccentricity adjusting motor and tilt adjusting motor using said amounts of movements of said table detected by said detecting means as amounts of feedback.

2. The apparatus of claim 1, wherein said computing means calculates central coordinates of said work mounted on said table at a plurality of locations along said rotational axis from said displacements on the locations of said circumferential surface of said work measured by said displacement detecting means, and computing said eccentricity and tilt based on said central coordinates.

3. An apparatus for measuring roundness, comprising:
a table for receiving a work mounted thereon, said work having a circumferential surface with a roundness to be measured;
displacement detecting means for detecting displacements on said circumferential surface of said work;
rotational driving means for rotationally driving either said table or said displacement detecting means such that said displacement detecting means detects said displacements along said circumferential surface of said work;
eccentricity adjusting means for adjusting an eccentricity in said work, said eccentricity adjusting means including an eccentricity adjusting motor to move said table in a plane perpendicular to the rotational axis of said rotational driving means;
tilt adjusting means for adjusting a tilt of said work to said rotational axis, said tilt adjusting means including a tilt adjusting motor to incline said table;
computing means for calculating said eccentricity and tilt of said work from said displacements on said circumferential surface of said work detected by said displacement detecting means; and
eccentricity/tilt compensating means for driving said eccentricity adjusting motor and tilt adjusting motor on the basis of said eccentricity and tilt obtained by said computing means to compensate said eccentricity and tilt,
wherein said eccentricity/tilt compensating means drives said eccentricity adjusting motor and tilt adjusting motor simultaneously.

4. An apparatus for measuring roundness, comprising:
a table for receiving a work mounted thereon, said work having a circumferential surface with a roundness to be measured;
displacement detecting means for detecting displacements on said circumferential surface of said work;
rotational driving means for rotationally driving either said table or said displacement detecting means such that said displacement detecting means detects said displacements along said circumferential surface of said work;
eccentricity adjusting means for adjusting an eccentricity in said work, said eccentricity adjusting means including means for detecting an adjusted eccentricity by detecting an amount of movement of said table when it is moved in a plane perpendicular to the rotational axis of said rotational driving means;
computing means for calculating an eccentricity in said work from said displacements on said circumferential surface of said work detected by said displacement detecting means; and
display means for displaying said adjusted eccentricity detected by said means for detecting an adjusted eccentricity and said eccentricity obtained by said computing means as an amount of eccentric compensation.

5. An apparatus for measuring roundness, comprising:
a table for receiving a work mounted thereon, said work having a circumferential surface with a roundness to be measured;
displacement detecting means for detecting displacements on said circumferential surface of said work;
rotational driving means for rotationally driving either said table or said displacement detecting means such that said displacement detecting means detects said displacements along said circumferential surface of said work;
tilt adjusting means for adjusting a tilt of said work to said rotational axis, said tilt adjusting means including means for detecting an adjusted tilt by detecting an amount of movement of said table when it is inclined;

computing means for calculating said tilt of said work from said displacements on said circumferential surface of said work detected by said displacement detecting means; and display means for displaying said adjusted tilt detected by said means for detecting an adjusted tilt and said tilt obtained by said computing means as an amount of tilt compensation.

6. An apparatus for measuring roundness, comprising:

a table for receiving a work mounted thereon;

detecting means for detecting displacements on said work, said work having a circumferential surface with a roundness to be measured;

rotational driving means for rotationally driving either said table or said detecting means about a rotational axis; and centering means for obtaining an eccentricity in said work from said rotational axis and compensating said eccentricity on measuring said roundness, wherein said centering means obtains an angular error between an operational direction of centering and an angular reference of said rotational driving means, said centering means centering said work on the basis of said angular error and said eccentricity.

7. An apparatus for measuring roundness, comprising:

a table for receiving a work mounted thereon;

detecting means for detecting displacements on said work, said work having a circumferential surface with a roundness to be measured;

rotational driving means for rotationally driving either said table or said detecting means about a rotational axis; and leveling means for obtaining a tilt of said work to said rotational axis and compensating said tilt on measuring said roundness, wherein said leveling means obtains an angular error between an operational direction of leveling and an angular reference of said rotational driving means, said leveling means leveling said work on the basis of said angular error and said tilt.

8. In a roundness measurement in which either a work or detecting means is rotationally driven about a rotational axis by rotational driving means to measure a roundness of said work by said detecting means, a method of centering for obtaining an eccentricity in said work from said rotational axis to compensate said eccentricity, said method comprising:

obtaining an angular error between an operational direction of centering and an angular reference of said rotational driving means; and centering said work on the basis of said angular error and said eccentricity.

9. The method of claim 8, wherein said angular error is calculated from central coordinates of said work before and after said work is moved a predetermined amount in said operational direction of centering.

10. The method of claim 8, wherein said centering is performed in said operational direction of centering after said angular reference of said rotational driving means is shifted by said angular error.

11. The method of claim 8, wherein said centering is performed after coordinate transformation of said eccentricity in said work into a coordinate system relative to said operational direction of centering based on said angular error.

12. In a roundness measurement in which either a work or detecting means is driven rotationally about a rotational axis by rotational driving means to measure a roundness of said work by said detecting means, a method of leveling for obtaining a tilt of said work to said rotational axis to compensate said tilt, said method comprising:

obtaining an angular error between an operational direction of leveling and an angular reference of said rotational driving means; and leveling said work on the basis of said angular error and said tilt.

13. The method of claim 12, wherein said angular error is calculated from central coordinates of said work before and after said work is moved a predetermined amount in said operational direction of leveling.

14. The method of claim 12, wherein said leveling is performed in said operational direction of leveling when said angular reference of said rotational driving means is shifted by said angular error.

15. The method of claim 12, wherein said leveling is performed after coordinate transformation of said tilt of said work into a coordinate system relative to said operational direction of leveling based on said angular error.

* * * * *